(12) United States Patent
Moldestad (10) Patent No.: US 9,120,447 B1
(45) Date of Patent: Sep. 1, 2015

(54) SAFETY SYSTEM FOR BACKING-UP A VEHICLE

(71) Applicant: Jon P. Moldestad, San Carlos, CA (US)

(72) Inventor: Jon P. Moldestad, San Carlos, CA (US)

(73) Assignee: Jon P. Moldestad, San Carlos, CA (US)

( * ) Notice: Subject to any disclaimer, the term of this patent is extended or adjusted under 35 U.S.C. 154(b) by 0 days.

(21) Appl. No.: 14/677,357

(22) Filed: Apr. 2, 2015

(51) Int. Cl.
| | | |
|---|---|---|
| *B60R 21/0136* | (2006.01) | |
| *B60Q 9/00* | (2006.01) | |
| *B60Q 1/00* | (2006.01) | |
| *B60Q 5/00* | (2006.01) | |
| *B60T 7/22* | (2006.01) | |
| *B60W 30/08* | (2012.01) | |
| *B60R 21/01* | (2006.01) | |

(52) U.S. Cl.
CPC .............. *B60R 21/0136* (2013.01); *B60Q 1/00* (2013.01); *B60Q 5/006* (2013.01); *B60Q 9/008* (2013.01); *B60T 7/22* (2013.01); *B60W 30/08* (2013.01); *B60R 2021/01013* (2013.01)

(58) Field of Classification Search
CPC ................. B60R 21/0136; B60R 2021/01013; B60T 7/22; B60W 30/08; B60Q 9/008; B60Q 5/006; B60Q 1/00
See application file for complete search history.

(56) References Cited

U.S. PATENT DOCUMENTS

| | | | |
|---|---|---|---|
| 2,238,306 A | 10/1939 | Braswell | |
| 2,728,032 A | 12/1952 | Foltz | |
| 3,582,109 A * | 6/1971 | Moore | ........................ 280/851 |
| 3,954,281 A | 5/1976 | Juergens | |
| 4,033,599 A | 7/1977 | Fusco | |
| 4,726,599 A | 2/1988 | Antekeier et al. | |
| 5,701,122 A | 12/1997 | Canedy | |
| 5,967,553 A | 10/1999 | Cominsky | |
| 6,158,775 A * | 12/2000 | Nickels | ........................ 280/847 |
| 6,565,122 B1 * | 5/2003 | Hansen | ........................ 280/851 |
| 7,909,343 B2 | 3/2011 | Archer et al. | |
| 2012/0326917 A1 | 12/2012 | Kiehne | |
| 2013/0282235 A1* | 10/2013 | Kamminga et al. | ............ 701/36 |

FOREIGN PATENT DOCUMENTS

JP 2012108706 A * 6/2012

OTHER PUBLICATIONS

NHTSA. Fatalities and Injuries in motor vehicle backing crashes. National highway traffic safety administration DOT HS 811 144 pp.1-42 (Nov. 2008).
Roscovision. Backup sensor kit for cars and trucks. [online] URL: http://www.roscovision.com/our-products/backup-sensors [retrived on Apr. 2, 2015].
Walmart.com. Peak dual-sensor backup system. [online] URL: http://www.walmart.com/ip/Peak-Dual-Sensor-Backup-System/15127259 [retrived on Apr. 2, 2015].
Workzone Safety.org. Preventing backovers. [online] URL: http://www.workzonesafety.org/runover_backover/ [retrived on Apr. 2, 2015].

* cited by examiner

*Primary Examiner* — Drew Brown
(74) *Attorney, Agent, or Firm* — Brian S. Boyer; Syndicated Law, PC (57) ABSTRACT

A safety system is provided that will (i) operate automatically, regardless of distraction or error by the driver or the backover victim; (ii) operate unaffected by the blindspots that block the driver's view or background noise that block audible alarms for the driver or the backover victim; (iii) operate through an external activation, intentional or unintentional, by the potential backover victim or passerby; and/or (iv) remove driver discretion by causing the vehicle to stop upon activation of the safety system by the potential backover victim or passerby.

13 Claims, 7 Drawing Sheets

SAFETY SYSTEM FOR BACKING-UP A VEHICLE

BACKGROUND

1. Field of the Invention

The teachings are directed to safety systems for trucks and motorized vehicles that mitigate the risk of backover accidents.

2. Description of the State-of-the-Art

Many construction works and pedestrians are killed or seriously injured annually by trucks and other motorized vehicles. One of the principal modalities of these occurrences is an individual being struck and crushed by the rear wheels while the truck or motorized vehicle is backing up.

Backovers can occur either on a public roadway or not on a public roadway, i.e., in a driveway or in a parking lot. The former are called traffic backovers and the latter nontraffic backovers. The National Highway Traffic Safety Administration's (NHTSA) existing Fatality Analysis Reporting System (FARS) and National Automotive Sampling System-General Estimates System (NASS-GES) provide information regarding backing crashes that occur on public trafficways. However, data regarding nontraffic backovers (and other backing crashes), those which occur on private roads, driveways, and parking lots, have not routinely been collected by NHTSA. In response to SAFETEA-LU Sections 2012 and 10305 and Section 2(f) of the Cameron Gulbransen Kids Transportation Safety Act of 2007, NHTSA developed the Not in Traffic Surveillance (NiTS) system to collect information about all nontraffic crashes, including nontraffic backover crashes. Combining the 221 NiTS backover fatalities with the annual average of 71 FARS backover fatalities produces an estimate of 292 total annual backover fatalities. The estimated 14,000 NiTS backover injuries when combined with the 4,000 NASS-GES backover injuries produces an estimate of 18,000 total annual backover injuries.

The leading cause of fatalities for workers in work zones is being run over or backed over by vehicles. While we often worry about construction workers being killed by motorists, road workers working behind the barriers in the work zone are at equal risk of being killed by construction vehicles due to their large "blind spots." Each month, at least one worker is killed by being backed over by a construction vehicle, often a dump truck. A commercial backover incident can occur, for example, when a backing vehicle strikes a worker who is standing, walking, or kneeling behind the vehicle. According to the Bureau of Labor Statistics, over 70 workers died from backover incidents in 2011. These kinds of incidents can occur in different ways. On Jun. 18, 2009, an employee was working inside a work zone wearing his reflective safety vest. A dump truck operating in the work zone backed up and struck the employee with the rear passenger side wheels. The employee was killed. The dump truck had an audible back up alarm and operating lights (OSHA Inspection Number 313225377). On Jun. 9, 2010, an employee was standing on the ground in front of a loading dock facing into the building while a tractor trailer was backing into the same dock. The trailer crushed the employee between the trailer and the dock (OSHA Inspection Number 314460940). In October 2006, the National Institute for Occupational Safety and Health recorded that a 28-year-old laborer was backed over by a tack truck while working as a flagger on an asphalt resurfacing job in a residential roadway work zone. The victim was standing with his back to the reversing tack truck when a dump truck driver attempted to warn him by waving his arms. The tack truck struck the victim; the driver thought he had passed over a manhole cover and continued backing. The tack truck driver stopped when he saw the dump truck driver running and waving his arms in his mirror. Both drivers found the victim at the front of the tack truck lying face down on a man-hole cover on the ground (NIOSH 2007). Between 1992 and 2009, NIOSH and State partners investigated 36 deaths of workers killed by backing construction vehicles or equipment on roadway construction worksites through the Fatality Assessment and Control Evaluation (FACE) Program.

Backover accidents can happen for a variety of reasons. Drivers may not be able to see a worker in their blind spot. Workers may not hear backup alarms because of other worksite noises or because the alarms are not functioning. A spotter assisting one truck may not see another truck behind him. Workers riding on vehicles may fall off and get backed over. Drivers may assume that the area is clear and not look in the direction of travel. Sometimes, it is unclear why a worker was in the path of a backing vehicle.

Many solutions exist to mitigate the risk of backover incidents. Drivers can use a spotter to help them back up their vehicles. Video cameras with in-vehicle display monitors can give drivers a view of what is behind them. Proximity detection devices, such as radar and sonar, can alert drivers to objects that are behind them. Tag-based systems can inform drivers when other employees are behind the vehicle and can alert employees when they walk near a vehicle equipped to communicate with the tag worn by the employee. On some work sites, employers can create internal traffic control plans, which tell the drivers where to drive and can reduce the need to back up. In some cases, internal traffic control plans can also be used to separate employees on foot from operating equipment. Training is another tool to prevent backover incidents. Blind spots behind and around vehicles are not immediately obvious to employees on foot. By training employees on where those blind spots are and how to avoid being in them, employers can prevent some backover incidents. One component of this training can include putting employees who will be working around vehicles in the driver's seat to get a feel for where the blind spots are and what, exactly, the drivers can see. The National Institute for Occupational Safety and Health (NIOSH) several blind spot diagrams that can help explain what drivers of various large trucks can see.

As such, one of skill will appreciate that a safety system is needed that will (i) operate automatically, regardless of distraction or error by the driver or the backover victim; (ii) operate unaffected by the blindspots that block the driver's view or background noise that block audible alarms for the driver or the backover victim; (iii) operate through an external activation, intentional or unintentional, by the backover victim; and/or (iv) remove driver discretion by causing the vehicle to stop upon activation of the safety system. Moreover, one of skill will appreciate a safety system that provides a novel and non-obvious solution to a level of safety's Hierarchy of Protection which is a part of the safety law that mandates strict hierarchy of protection mechanisms. One of skill appreciates the importance of this hierarchy and that hazards must follow a strict hierarchical order of being "engineered out", and if not engineered out, then they must be "guarded", and if not engineered out or guarded, then they must have a "warning". As such, one of skill will appreciate the value of the systems taught herein as a "guard" which actually supersedes the value of the traditional "warnings" that include the audible backup alarms in current use. Accordingly, the devices taught herein are expected to be mandated on vehicles, if for no other reason, due to their importance and criticality to the hierarchical level of "warning" in the Hierarchy of Protection.

SUMMARY OF THE INVENTION

Safety systems for backing-up a vehicle are provided herein, the safety system mitigating the risk of an object, such as a human or animal, from being run over by the rear wheels of the vehicle when backing-up. The systems can have a safety switch that is activated through an actuator mechanism that identifies the object as the object approaches from behind the rear wheel of the vehicle while the vehicle is moving in a backward direction.

The actuator mechanism can be a mudflap, for example. As such, the teachings include a safety mudflap system for a vehicle. These systems comprise a mudflap having a front surface, a back surface, and surface for operably attaching the mudflap to a vehicle with an attachment mechanism; an alert device that, for example, can be a video and/or audio display for a driver of the vehicle; and, a safety switch configured for an actuation by an application of a force to the back surface of the mudflap, wherein the actuation of the switch powers the alert device to alert the driver of the vehicle of the force applied to the back surface of the mudflap.

It should be appreciated that the mudflap can be at least substantially inflexible when the force is applied to the back surface of the mudflap. As such, the mudflap does not need to be rigid but, rather, inflexible enough to activate the switch when force is applied to the mudflap.

It should also be appreciated that the actuator mechanism should be attached to the vehicle in an operable connection with the switch. As such, the attachment mechanism can be a hanger mechanism. In some embodiments, the attachment mechanism is a hanger mechanism, and the safety switch is a limit switch that makes a connection. Likewise, in some embodiments, the attachment mechanism is a hanger mechanism, and the safety switch is a limit switch that breaks a connection.

The systems can include an alert device having, for example, a video and/or audio display for a driver of the vehicle; and, a safety switch configured for an actuation by an application of a force to the back surface of the actuator mechanism. The actuation of the switch, for example, can power the alert device to alert the driver of the vehicle that a force has been applied to the actuator mechanism. In the alternative, the actuation of the switch can activate vehicle brakes, shut-off the engine of the vehicle, or a combination thereof.

In some embodiments, the actuation of the safety switch powers a light that is visible to the driver of the vehicle. In some embodiments, the alert device is a speaker, and the actuation of the safety switch powers the speaker to create a sound that is audible to the driver of the vehicle. In some embodiments, the alert device is a braking mechanism, and the actuation of the safety switch powers the braking mechanism to stop the vehicle. In some embodiments, the alert device is a breaker switch, and actuation of the safety switch activates the breaker switch to shut off the engine of the vehicle.

The teachings are also directed to methods of safely operating a vehicle. In some embodiments, the methods comprise operating a vehicle having the safety systems taught herein. In some embodiments, the methods comprise driving the vehicle in reverse, the vehicle comprising the safety mudflap systems taught herein; receiving a warning that is triggered through the actuation of the safety switch; and, responding to the warning. In some embodiments, the safety systems can be activated externally, without participation of the driver. For example, a person that is located behind the rear wheel of the vehicle can activate the actuator mechanism to power the alert device to alert the driver of the vehicle that a force has been applied to the actuator mechanism. In the alternative, the person located behind the rear wheel of the vehicle can activate vehicle brakes, shut-off the engine of the vehicle, or a combination thereof, by activating the actuator mechanism.

The teachings are also directed to methods of manufacturing the safety systems taught herein. In some embodiments, the method comprises operably attaching the actuator mechanism, such as the mudflap, to the safety switch; operably attaching the safety switch to the alert device; and, operably attaching the actuator mechanism to the attachment mechanism.

The teachings are also directed to methods of installing the safety systems taught herein to a vehicle. In some embodiments, the method comprises operably attaching the actuator mechanism, such as the mudflap, to the safety switch; operably attaching the safety switch to the alert device; operably attaching the mudflap to the attachment mechanism; and, operably attaching the attachment mechanism to the vehicle.

One of skill in the art will appreciate having a safety system that will (i) operate automatically, regardless of distraction or error by the driver or the backover victim; (ii) operate unaffected by the blindspots that block the driver's view or background noise that block audible alarms for the driver or the backover victim; (iii) operate through an external activation, intentional or unintentional, by the potential backover victim or passerby; and/or (iv) remove driver discretion by causing the vehicle to stop upon activation of the safety system by the potential backover victim or passerby.

DETAILED DESCRIPTION

Safety systems for backing-up a vehicle are provided herein, the safety system mitigating the risk of an object, such as a human or animal, from being run over by the rear wheels of the vehicle when backing-up. In fact, one of skill will appreciate that, in some embodiments, any wheel of the vehicle can run over an object, such as a human or animal, the wheel being, for example, a front wheel, rear wheel, a wheel between the front wheel and rear wheel, an inner wheel in paired wheels, an outer wheel in paired wheels, and the like. In some embodiments, the wheel is a trailer wheel.

Figure 1:
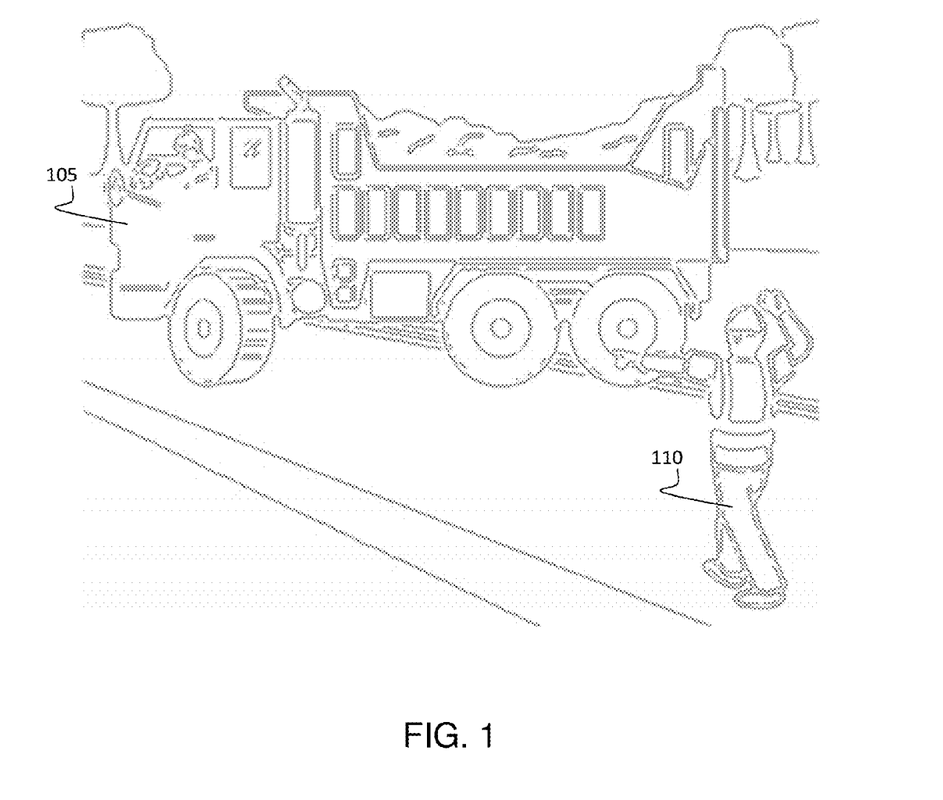
FIG. 1 shows a scenario in which a backover accident can occur, according to some embodiments.

FIG. 1 shows a scenario in which a backover accident can occur, according to some embodiments. Dump truck 105 can backover worker 110 under conditions in which the worker 110 did not see the dump truck 105, the driver of the dump truck 105 did not see the worker 110 in a "blindspot," or either the driver of the dump truck 105 or worker 110 were distracted.

Figure 2:
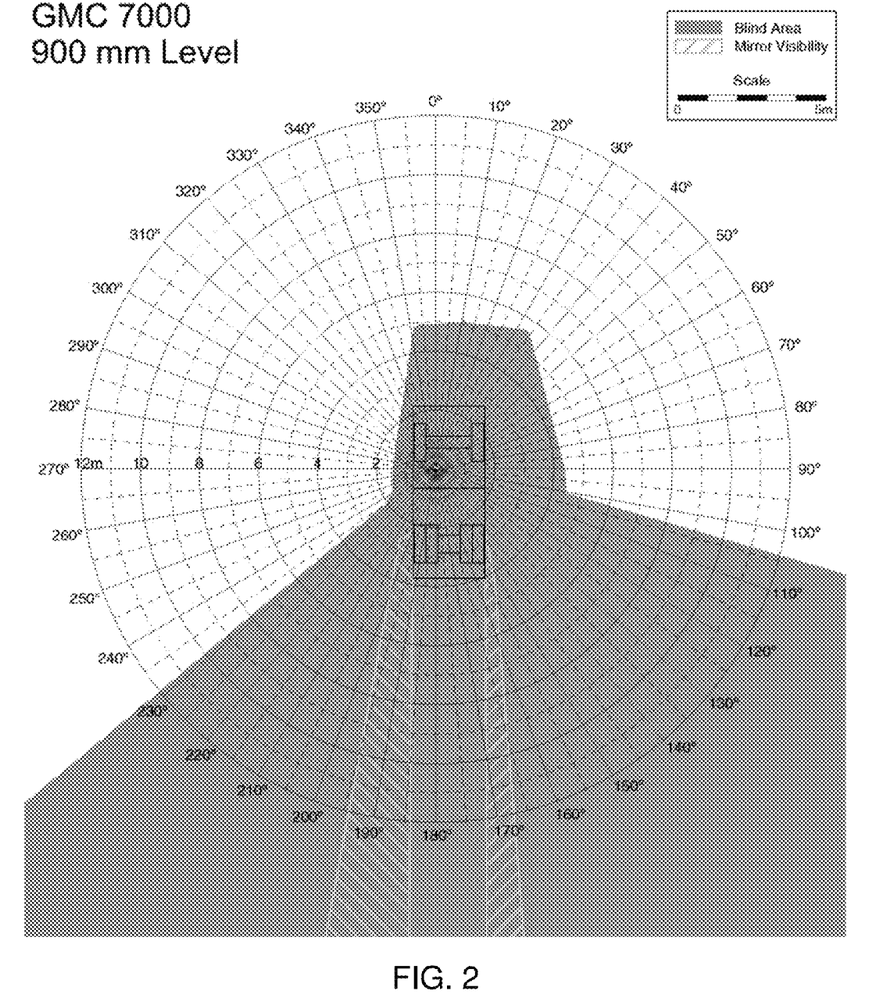
FIG. 2 provides a diagram of the blindspots for the driver of a dump truck, according to some embodiments.

FIG. 2 provides a diagram of the blindspots for the driver of a dump truck, according to some embodiments. The blindspots are calculated for a dump truck model GMC 7000, for example, and for objects as tall as an orange pylon, representative of a worker that may have fallen. As can be seen from the FIG. 2, there is a substantial area in which a fallen worker would not be seen, particularly when backing-up.

The safety systems taught herein can have a safety switch that is activated through an actuator mechanism that identifies the object as the object approaches from behind the rear wheel of the vehicle while the vehicle is moving in a backward direction. One of skill will appreciate a simple mechanism for mitigating the risk of backover accidents that addresses the problems of blindspots, background noise, and human error. In these systems, the worker 110 can externally activate the actuator mechanism on his own, avoiding total reliance on the driver of the dump truck 105.

Figure 3A:
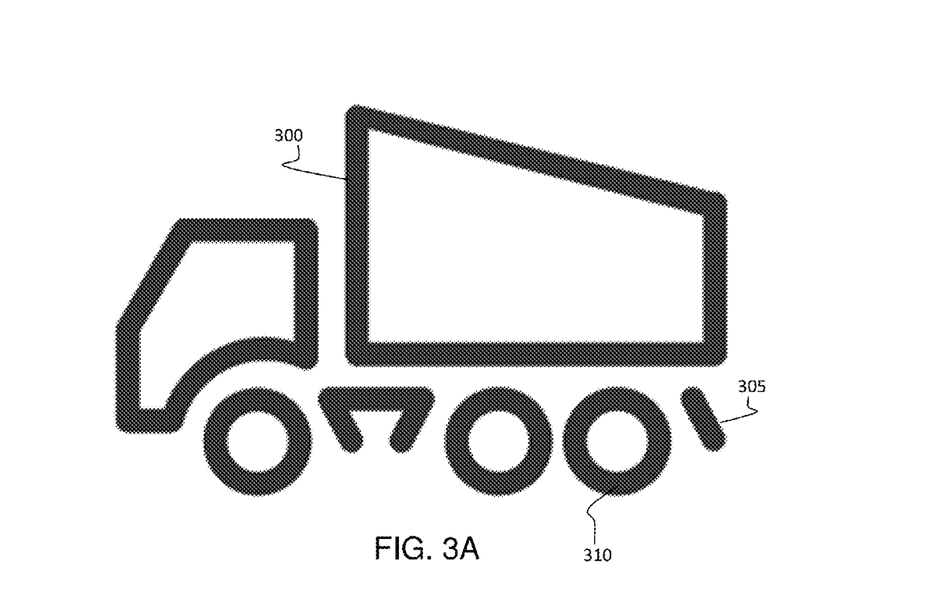
FIGS. 3A and 3B show the relationships between a truck, the rear wheel, and the actuator mechanisms, according to some embodiments.
Figure 3B:
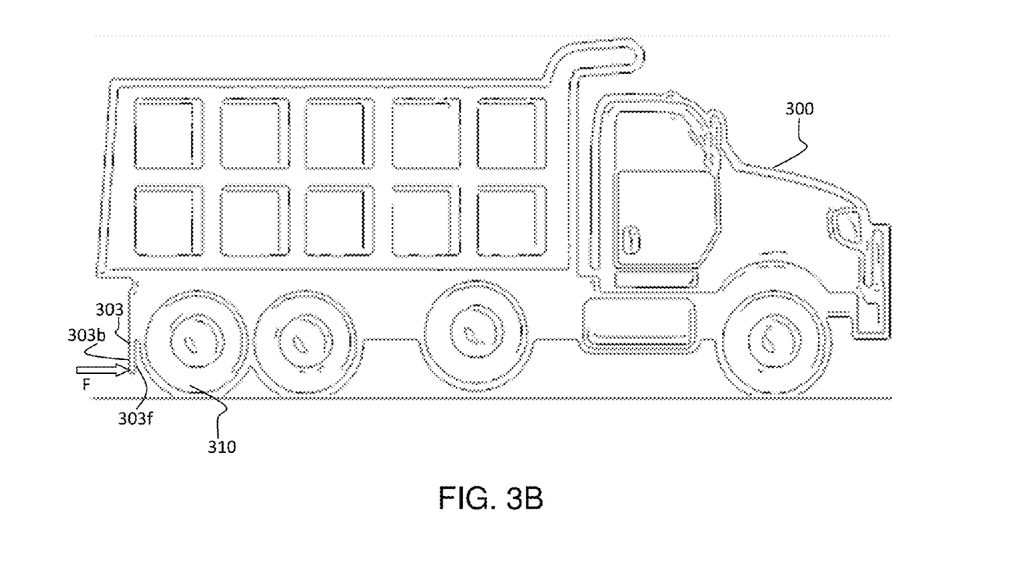

FIGS. 3A and 3B show the relationships between a truck, the rear wheel, and the actuator mechanisms, according to some embodiments. As shown in FIG. 3A, a truck 300 can have an actuator mechanism 305 located directly behind a rear wheel 310. In these embodiments, the actuator mechanism 305 can be activated. The actuator mechanism 305 can be a mudflap 303, for example. As shown in FIG. 3B, the mudflap 303 can have a front surface 303f, a back surface 303b, and surface (not shown) for operably attaching the mudflap 303 to the vehicle 300 with an attachment mechanism (not shown); an alert device (not shown) that, for example, can be a video and/or audio display for a driver of the vehicle; and, a safety switch (not shown) configured for an actuation by an application of a force, F, to the back surface of the mudflap 305, wherein the actuation of the safety switch powers the alert device to alert the driver of the vehicle 300 of the force, F, applied to the back surface 303b of the mudflap 303.

It should be appreciated that the mudflap can be at least substantially inflexible when the force is applied to the back surface of the mudflap. The term "at least substantially inflexible" is intended to mean that the mudflap does not need to be rigid but can flex some if desired, as long as it is inflexible enough to operably activate the switch when force is applied to the back surface 303b of the mudflap 303.

The actuator mechanism can include a mudflap or a mud guard. The mudflap can be a large rectangular sheet suspended behind the rear tire, or a smaller molded flap or lip, such as a small molded lip that is mounted below the rear of the vehicle wheel well. In some embodiments, the actuator mechanism, or mudflap, is no more than about 4", about 5", about 6", about 7", about 8", about 9", about 10", about 11", or about 12" from the roadway.

It should also be appreciated that the actuator mechanism should be attached to the vehicle in an operable connection with the switch. In some embodiments, the attachment mechanism is a hanger mechanism, and the safety switch is a limit switch that makes a connection. Likewise, in some embodiments, the attachment mechanism is a hanger mechanism, and the safety switch is a limit switch that breaks a connection. And, in some embodiments, the existing mudflaps and electrical circuitry for back-up lights/alarms may be combined with an actuator mechanism to provide an operable safety system as taught herein.

In some embodiments, the safety switch is a limit switch or a relay switch (electronic switch using a semiconductor device to perform the switching) in the case where the switch is operated by another electrical circuit. In some embodiments, the switch can be a toggle switch or a momentary "biased" switch, which can include a push-to-make or push-to-break type of switch. In some embodiments, the switch is a single pole, single throw switch. And, in some embodiments, the switch can include a solenoid switch. In some embodiments, the switch can be a rotary switch that operates with the twisting motion of the actuator mechanism. In some embodiments, the switch is a braking switch that activates the brakes, a kill switch to kill the engine of the vehicle, an alarm switch to sound an audible alarm, a light switch to activate a visual alarm, and the like.

The systems can include an alert device having, for example, a video and/or audio display for a driver of the vehicle; and, a safety switch configured for an actuation by an application of a force to the back surface of the actuator mechanism. The actuation of the switch, for example, can power the alert device to alert the driver of the vehicle that a force has been applied to the actuator mechanism. In the alternative, the actuation of the switch can activate vehicle brakes, shut-off the engine of the vehicle, or a combination thereof.

In some embodiments, the actuation of the safety switch powers a light that is visible to the driver of the vehicle. In some embodiments, the alert device is a speaker, and the actuation of the safety switch powers the speaker to create a sound that is audible to the driver of the vehicle. In some embodiments, the alert device is a braking mechanism, and the actuation of the safety switch powers the braking mechanism to stop the vehicle. In some embodiments, the alert device is a breaker switch, and actuation of the safety switch activates the breaker switch to shut off the engine of the vehicle.

The teachings are also directed to methods of safely operating a vehicle. In some embodiments, the methods comprise operating a vehicle having the safety systems taught herein. In some embodiments, the methods comprise driving the vehicle in reverse, the vehicle comprising the safety mudflap systems taught herein; receiving a warning that is triggered through the actuation of the safety switch; and, responding to the warning. In some embodiments, the safety systems can be activated externally, without participation of the driver. For example, a person that is located behind the rear wheel of the vehicle can activate the actuator mechanism to power the alert device to alert the driver of the vehicle that a force has been applied to the actuator mechanism. In the alternative, the person located behind the rear wheel of the vehicle can activate vehicle brakes, shut-off the engine of the vehicle, or a combination thereof, by activating the actuator mechanism.

The teachings are also directed to methods of manufacturing the safety systems taught herein. In some embodiments, the method comprises operably attaching the actuator mechanism, such as the mudflap, to the safety switch; operably attaching the safety switch to the alert device; and, operably attaching the actuator mechanism to the attachment mechanism.

The teachings are also directed to methods of installing the safety systems taught herein to a vehicle. In some embodiments, the method comprises operably attaching the actuator mechanism, such as the mudflap, to the safety switch; operably attaching the safety switch to the alert device; operably attaching the mudflap to the attachment mechanism; and, operably attaching the attachment mechanism to the vehicle.

The teachings are also directed to methods of stopping a vehicle before it backs over a victim. In these embodiments, the method comprises observing the vehicle approaching the victim and activating the safety switch through actuation mechanism externally before it backs over the victim. In some embodiments, the activation of the safety switch sounds an alarm, activates a visual display, kills the engine, activates the brakes, or a combination thereof. In some embodiments, the activation is done by the victim intentionally by contact with the victim. In some embodiments, the activation is done by the victim unintentionally by contact with the victim. In some embodiments, the activation is done by a third party that is acting to prevent the backover of the victim.

The following examples are illustrative of the uses of the present teachings. It should be appreciated that the examples are for purposes of illustration and are not to be construed as otherwise limiting to the teachings.

Example 1

A Safety System Having a Deflectable Mudflap that Activates the Vehicle Brakes when the Vehicle is Backing-Up This example describes a system in which a mudflap is operably connected to a switch that activates an alert or response only when the vehicle is backing-up. The system will activate the brakes and/or kill the engine on the vehicle upon deflection of the mudflap due to a force on the back of the mudflap that is directed toward the rear wheel.

Figure 4:
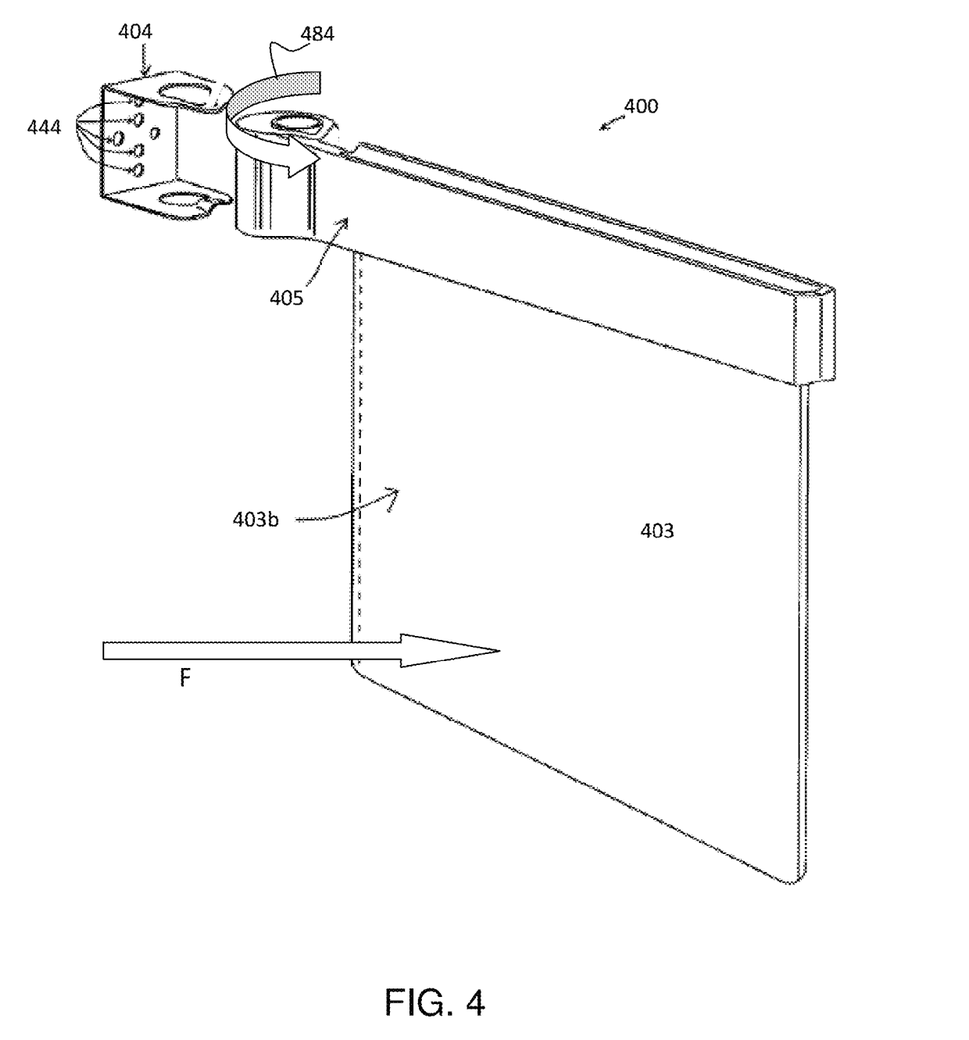
FIG. 4 illustrates an actuator mechanism that includes a rotary activated switch, according to some embodiments.

FIG. 4 illustrates an actuator mechanism that includes a rotary activated switch, according to some embodiments. As shown in FIG. 4, the actuator mechanism 400 is a rotary 484 mechanism that rotates to activate the safety switch (not shown but operably connected to the rotary 484 mechanism) when force, F, is applied to the back surface 403b of the mudflap 403. The actuator arm 405 is attached to mounting bracket 404 through an operable attachment 444 to the vehicle.

Example 2

A Safety System Having a Deflectable Mudflap that Activates the Vehicle Kill Switch when the Vehicle is Backing-Up This example describes a system in which a mudflap is operably connected to a switch that activates an alert or response only when the vehicle is backing-up. The system will kill the engine and/or activate the brakes on the vehicle upon deflection of the mudflap due to a force on the back of the mudflap that is directed toward the rear wheel. In some embodiments, to avoid "falsings" due to wind blowing on the mudflaps, the system will only kill the engine and/or activate the brakes, or other audio or visual alert, when the vehicle's transmission is operating in reverse.

Figure 5:
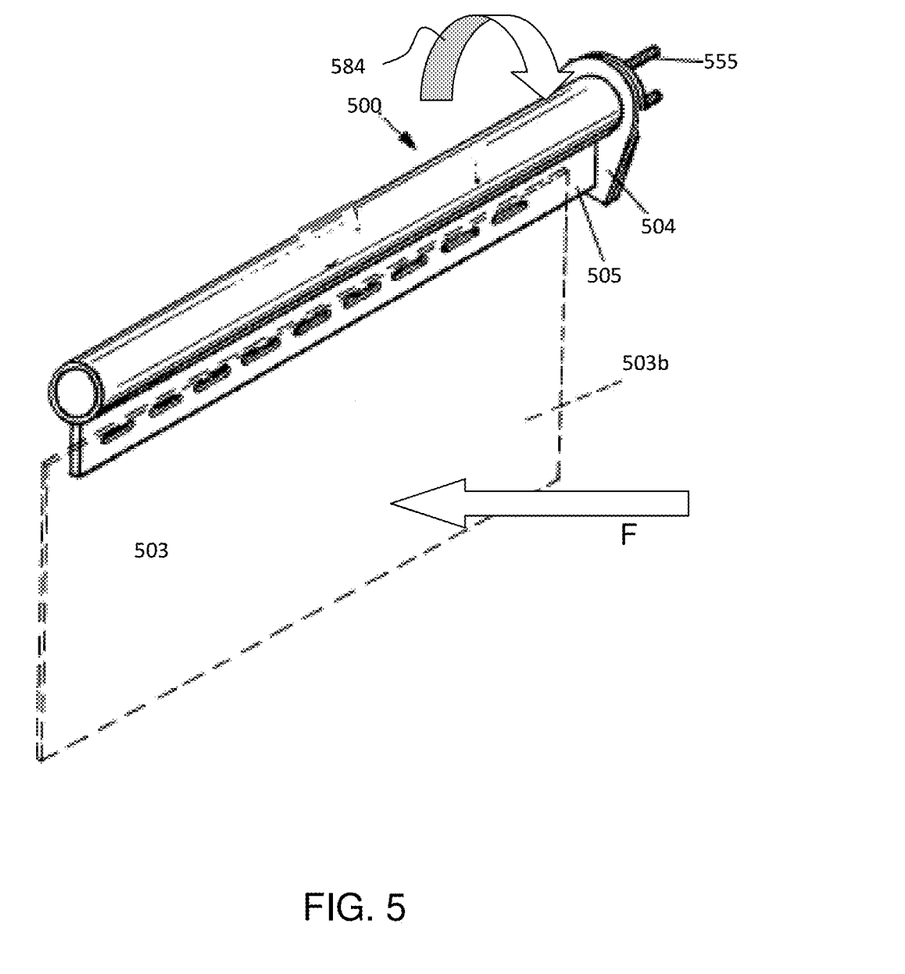
FIG. 5 illustrates an actuator mechanism that includes a rotary activated switch, according to some embodiments.

FIG. 5 illustrates an actuator mechanism that includes a rotary activated switch, according to some embodiments. As shown in FIG. 4, the actuator mechanism 500 is a rotary 584 mechanism that rotates to activate the safety switch (not shown) when force, F, is applied to the back surface 503b of the mudflap 503. The actuator arm 505 is attached to mounting bracket 504 through an operable attachment 555 to the vehicle.

Example 3

A Safety System Retrofitted Using the Existing Electrical Circuitry

A safety system as taught herein can be retrofitted using existing electrical circuitry on a vehicle. In such systems, the back-up lights/alarms may be combined with an actuator mechanism to provide an operable safety system as taught herein.

For example, the system can be configured to kill the engine and/or activate the brakes, or other audio or visual alert, using the electrical circuitry for back-up lights/alarms. And, the actuator mechanism can also be the existing mudflaps in some embodiments. In some embodiments, the circuitry can be operatively combined with the actuator mechanism, such as the mudflaps, to open or close the circuit that powers an air brake mechanism, the ignition circuit that allows for operation of the engine of the vehicle, other audio or visual alert, or a combination thereof. In some embodiments, the existing circuitry can include an external power source and/or solenoid to facilitate opening or closing the circuit as needed for a given system.

A kit can be provided that includes a mudflap converter for operatively attaching an existing mudflap as a component in the safety system. The mudflap can have a front surface, a back surface, and surface for operably attaching the mudflap to a vehicle with an attachment mechanisman alert device. The kit can also include safety switch configured for activating the system by an application of a force to the back surface of the mudflap. The actuation of the switch powers the alert device through the existing electrical circuitry to alert a driver of the vehicle of the force applied to the back surface of the mudflap. And, the system can be limited to operate only when the transmission is in reverse to avoid the "falsings", i.e. a false alarm, caused by, for example, gusts of wind on the back surface of the mudflap during operation of the vehicle. A false alarm can occur by any source of force on the back of the mudflap that is not caused by an object behind the respective wheel adjacent to the mudflap.

Example 4

A Safety System in which the Actuator Mechanism is a Bar or Lever

A safety system can be designed to have an actuator mechanism that is not a mudflap but, rather, a bar or lever that can activate the safety switch through contact with an object behind the wheel, or by actuation through another external force, such as by the hand of a victim or a passerby.

Figure 6A:
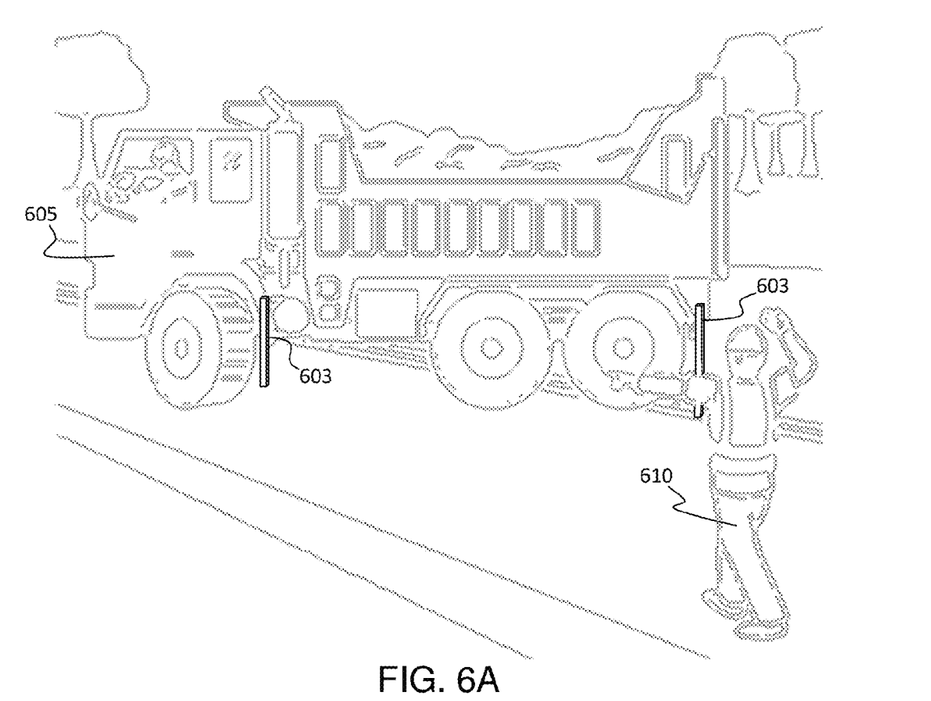
FIGS. 6A-6B illustrate a bar or lever actuator mechanism, according to some embodiments.
Figure 6B:
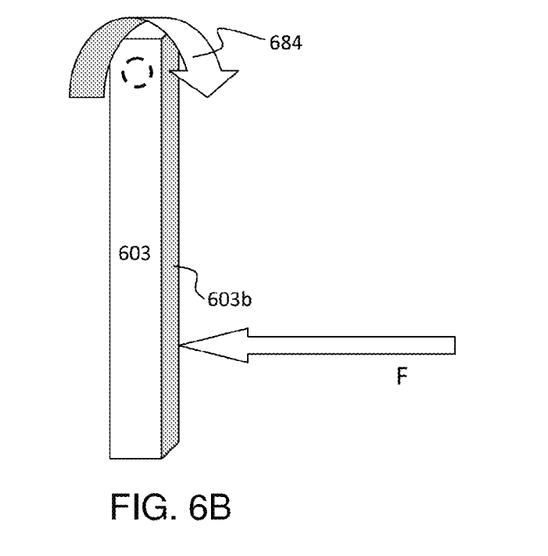

FIGS. 6A-6B illustrate a bar or lever actuator mechanism, according to some embodiments. As shown in FIG. 6A, dump truck 605 can backover worker 610 under conditions in which the worker 610 did not see the dump truck 605, the driver of the dump truck 605 did not see the worker 610 in a "blind-spot," or either the driver of the dump truck 605 or worker 610 were distracted. And, as shown in FIG. 6B, if the worker 610 had fallen behind a wheel and is concious, the worker 610 could manually hit the actuator mechanism 603, or bar or lever, applying a force, F, to the backside 603b of the actuator mechanism 603, or bar or lever. The actuator mechanism 603, or bar or lever, activates the safety switch that is operatively connected to the actuator mechanism 603, or bar or lever when turning in a rotary 684 manner. Likewise, if the worker 610 is unconscious, the actuator mechanism 603, or bar or lever can have a length that is close enough to the ground to be activated by content with an object behind the wheel, such as a human or animal. For example, the actuator mechanism 603, or bar or lever can extend to the ground and leave a distance of only from about 4" to about 18" from the ground, from about 4" to about 12" from the ground, from about 4" to about 9" from the ground, from about 5" to about 10" from the ground, or any range therein in increments of 0.1". In some embodiments, the actuator mechanism 603, or bar or lever can extend to the ground and leave a distance of only from about 3", about 4", about 5", about 6", about 7", about 8", about 9", about 10", about 11", or about 12" above the ground to activate by having a force, F, apply to the backside 603b of the actuator mechanism from an object, such as a human or animal, or any object that is high enough to activate the actuator mechanism. It should be appreciate that the actuator mechanism 603, or bar or lever, can have any convenient shape or configuration, so as a square cylinder, round cylinder, elliptical cylinder, or a bar or lever with a flat surface for applying a force from a hand, for example. In some embodiments, the actuator mechanism 603 can have a flat surface, a spherical surface, a convex surface, a concave surface, or a combination thereof.

Figure 7A:
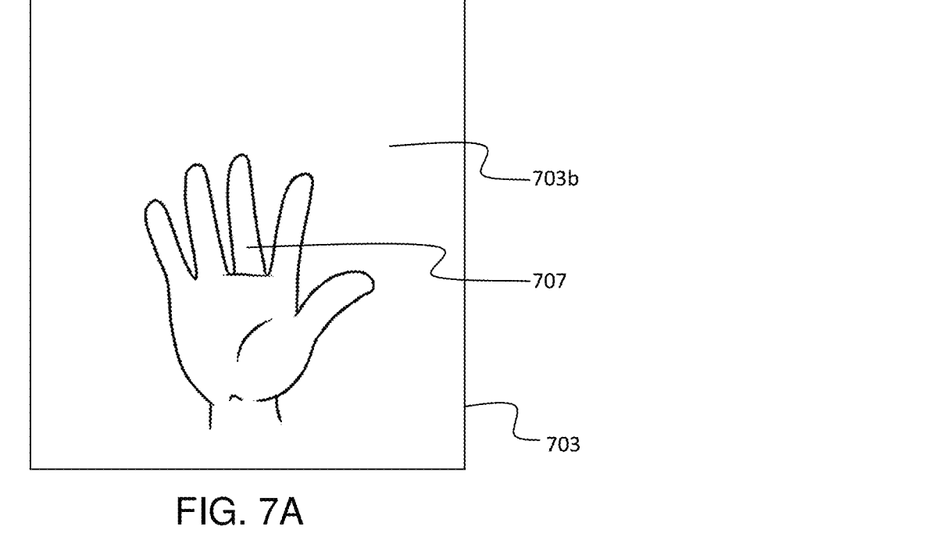
FIGS. 7A and 7B show highlighted impact areas on actuator mechanisms, according to some embodiments.
Figure 7B:
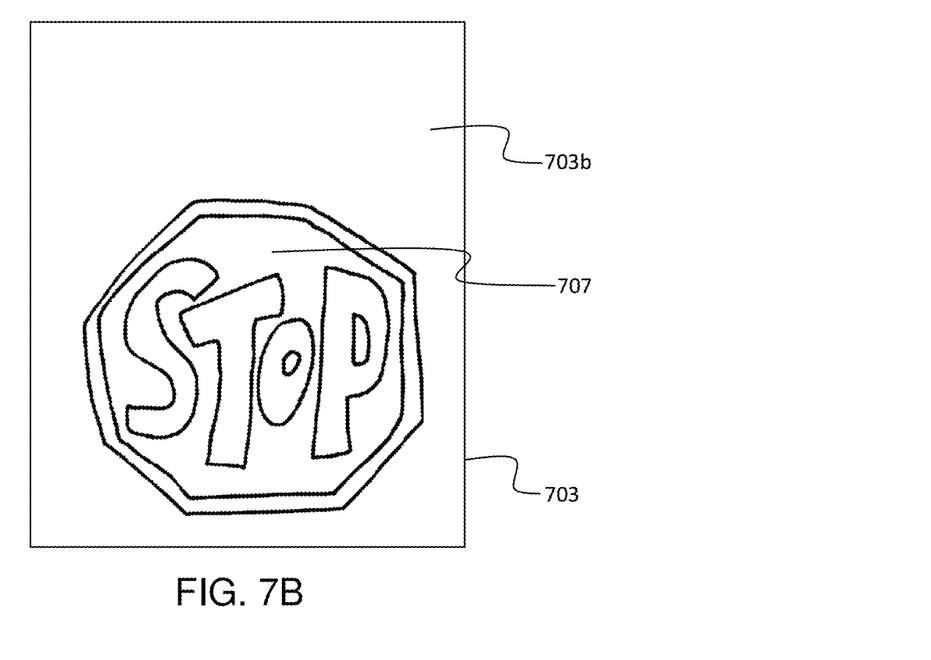

FIGS. 7A and 7B show highlighted impact areas on actuator mechanisms, according to some embodiments. One of skill will appreciate that the victim or passerby can potentially react faster by a faster recognition of the actuator mechanism that activates the safety switch. FIG. 7A provides an intuitive "hand" symbol to speed up the recognition of the actuator mechanism by the victim or passerby. FIG. 7B provides a well-know "STOPSIGN" symbol to speed up the recognition of the actuator mechanism by the victim or passerby.

Example 5

A Safety System for a Method of Meeting a Warning Level in the Hierarchy of Protection A safety system can be designed to provide a method of meeting a warning level in the Hierarchy of Protection. The method comprises providing a guard mechanism that includes an actuator mechanism having a front surface, a back surface, and surface for operably attaching the actuator mechanism to a vehicle with an attachment mechanism; an alert device; and, a safety switch configured for an actuation by an application of a force to the back surface of the actuator mechanism. The actuation of the switch powers the alert device to alert a driver of the vehicle of the force applied to the back surface of the actuator mechanism. The system can operate to open or close the circuit that powers an air brake mechanism, the ignition circuit that allows for operation of the engine of the vehicle, other audio or visual alert, or a combination thereof. As such, one of skill will appreciate the value of the systems taught herein as a "guard" which actually supersedes the value of the traditional "warnings" that include the audible backup alarms in current use. Accordingly, the devices taught herein are expected to be mandated on vehicles, if for no other reason, due to their importance and criticality to the hierarchical level of "warning" in the Hierarchy of Protection.

We claim:

1. A safety mudflap system for a vehicle, comprising:
   a mudflap having a front surface, a back surface, and surface for operably attaching the mudflap to a vehicle with an attachment mechanism;
   an alert device;
   a safety switch configured for an actuation by an application of a force to the back surface of the mudflap, wherein the actuation of the switch powers the alert device to alert a driver of the vehicle of the force applied to the back surface of the mudflap.

2. The system of claim 1, wherein the mudflap is at least substantially inflexible when the force is applied to the back surface of the mudflap.

3. The system of claim 1, wherein the attachment mechanism is a hanger mechanism.

4. The system of claim 1, wherein the attachment mechanism is a hanger mechanism, and the safety switch is a limit switch that makes a connection.

5. The system of claim 1, wherein the attachment mechanism is a hanger mechanism, and the safety switch is a limit switch that breaks a connection.

6. The system of claim 1, wherein the actuation of the safety switch powers a light that is visible to the driver of the vehicle.

7. The system of claim 1, wherein the alert device is a speaker, and the actuation of the safety switch powers the speaker to create a sound that is audible to the driver of the vehicle.

8. The system of claim 1, wherein the alert device is a braking mechanism, and the actuation of the safety switch powers the braking mechanism to stop the vehicle.

9. The system of claim 1, wherein the alert device is a breaker switch, and actuation of the safety switch activates the breaker switch to shut off the engine of the vehicle.

10. A method of safely operating a vehicle, the method comprising operating a vehicle having the safety mudflap system of claim 1.

11. A method of safely operating a vehicle, the method comprising:
   driving the vehicle in reverse, the vehicle comprising the safety mudflap system of claim 1;
   receiving a warning that is triggered through the actuation of the safety switch; and,
   responding to the warning.

12. A method of manufacturing the safety mudflap system of claim 1, the method comprising:
   operably attaching the mudflap to the safety switch;
   operably attaching the safety switch to the alert device; and,
   operably attaching the mudflap to the attachment mechanism.

13. A method of installing the safety mudflap system of claim 1 to a vehicle, the method comprising:
   operably attaching the mudflap to the safety switch;
   operably attaching the safety switch to the alert device;
   operably attaching the mudflap to the attachment mechanism; and,
   operably attaching the attachment mechanism to the vehicle.

* * * * *